J. M. SCHUTZ.
GYRATOR.
APPLICATION FILED APR. 1, 1905.

900,313.

Patented Oct. 6, 1908.

5 SHEETS—SHEET 1.

Witnesses:-

Inventor:-
Joseph M. Schutz

J. M. SCHUTZ.
GYRATOR.
APPLICATION FILED APR. 1, 1905.

900,313.

Patented Oct. 6, 1908.
5 SHEETS—SHEET 3.

Witnesses

Inventor:-
Joseph M. Schutz

J. M. SCHUTZ.
GYRATOR.
APPLICATION FILED APR. 1, 1905.
900,313.
Patented Oct. 6, 1908.
5 SHEETS—SHEET 4.
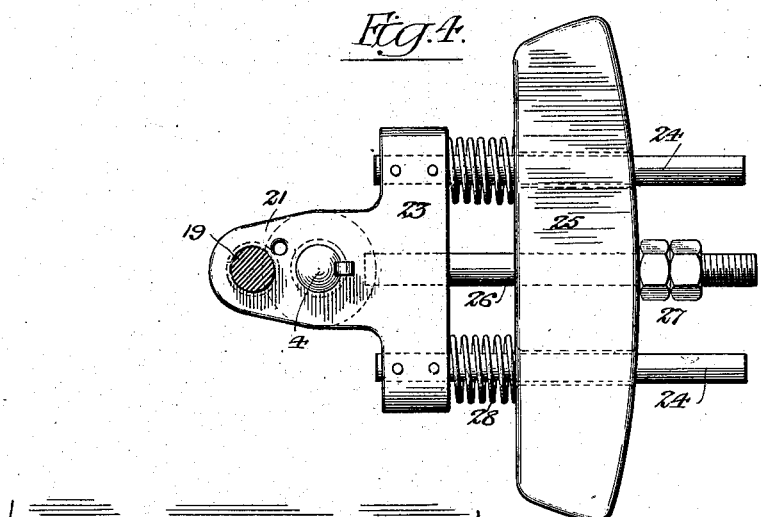
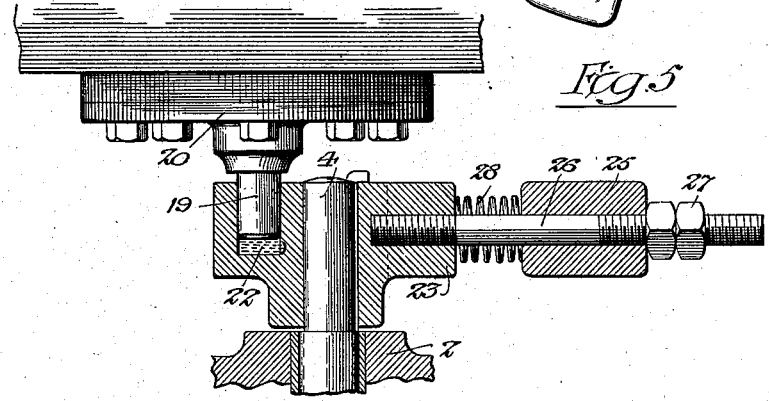
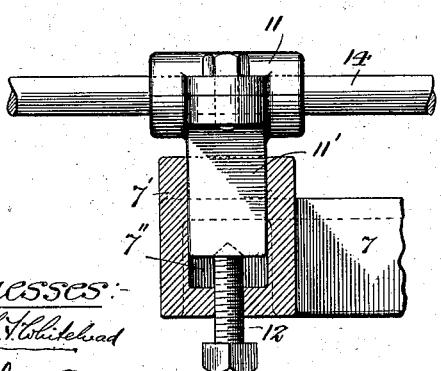
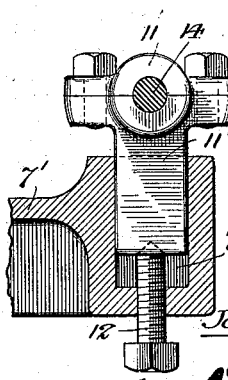
Witnesses:—
Inventor:—
Joseph M. Schutz.

J. M. SCHUTZ.
GYRATOR.
APPLICATION FILED APR. 1, 1905.
900,313.
Patented Oct. 6, 1908.
5 SHEETS—SHEET 5.
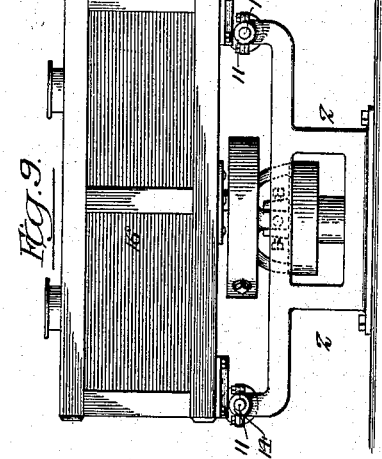
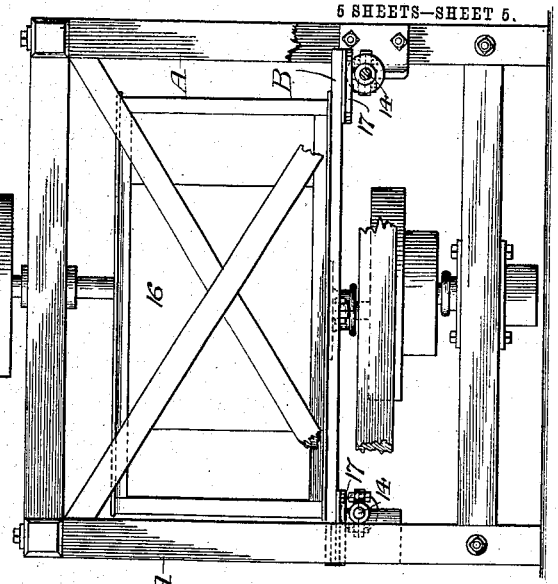
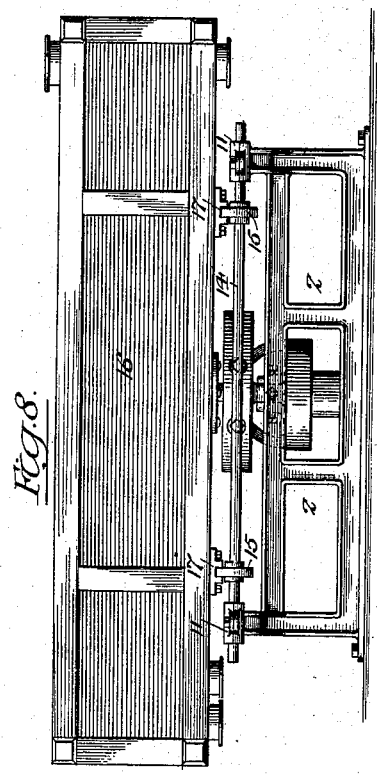
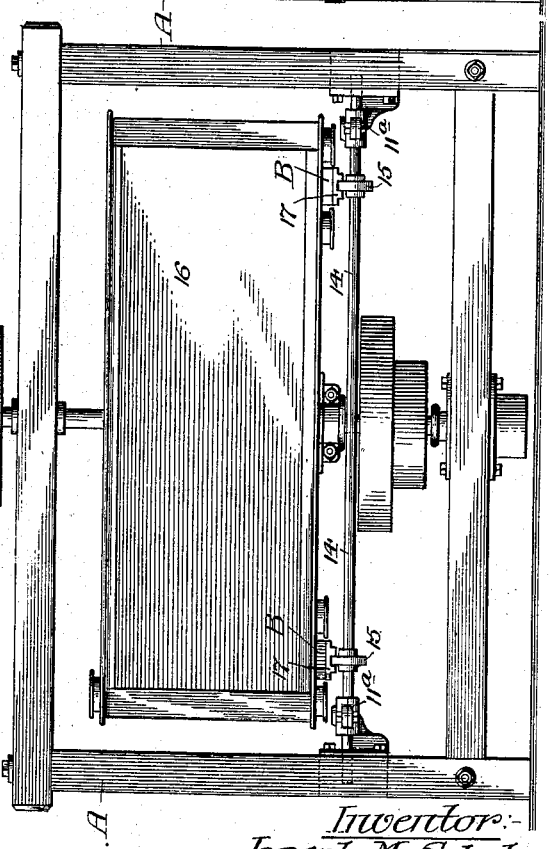
Witnesses:—
Inventor:—
Joseph M. Schutz
by O. Hawley Atty.

UNITED STATES PATENT OFFICE.

JOSEPH M. SCHUTZ, OF MINNEAPOLIS, MINNESOTA, ASSIGNOR TO SCHUTZ-O'NEILL CO., OF MINNEAPOLIS, MINNESOTA, A CORPORATION OF MINNESOTA.

GYRATOR.

No. 900,313.        Specification of Letters Patent.        Patented Oct. 6, 1908.

Application filed April 1, 1905. Serial No. 253,344.

*To all whom it may concern:*

Be it known that I, JOSEPH M. SCHUTZ, of Minneapolis, Hennepin county, Minnesota, have invented a certain new, useful, and Improved Gyrator, of which the following is a specification.

My invention relates to improvements in sifting, screening, concentrating and like machines, and has particular reference to novel means for imparting gyratory motion to the working members or bodies of such machines.

The object of my invention is to provide means for gyrating sieves, screens, concentrating tables and the like, without the heavy secondary vibration which characterizes the machines in common use.

The particular object of the invention is to provide a gyrating mechanism, which, in comparison with the mechanisms devised by others, shall be more simple, less costly, more durable, more effective, better balanced and of better appearance.

A further object of this invention is to provide a gyrating mechanism which shall be complete in itself, without the hangers or links usually employed to support the gyratory body.

A further and special object of the invention is to improve the gyrator which is shown and described in Letters Patent No. 756,292, granted to me April 5th, 1904, and to adapt the principles thereof to machines of all classes.

A machine embodying my invention comprises a base or support, a member, such as a body, plate frame or table, to be gyrated, and suitable—usually rotary—means for causing movement of said member; in combination with peculiar and novel-mechanism for confining and limiting the movement of said member to gyration, all as hereinafter described and particularly pointed out in the claims.

Figure 1:
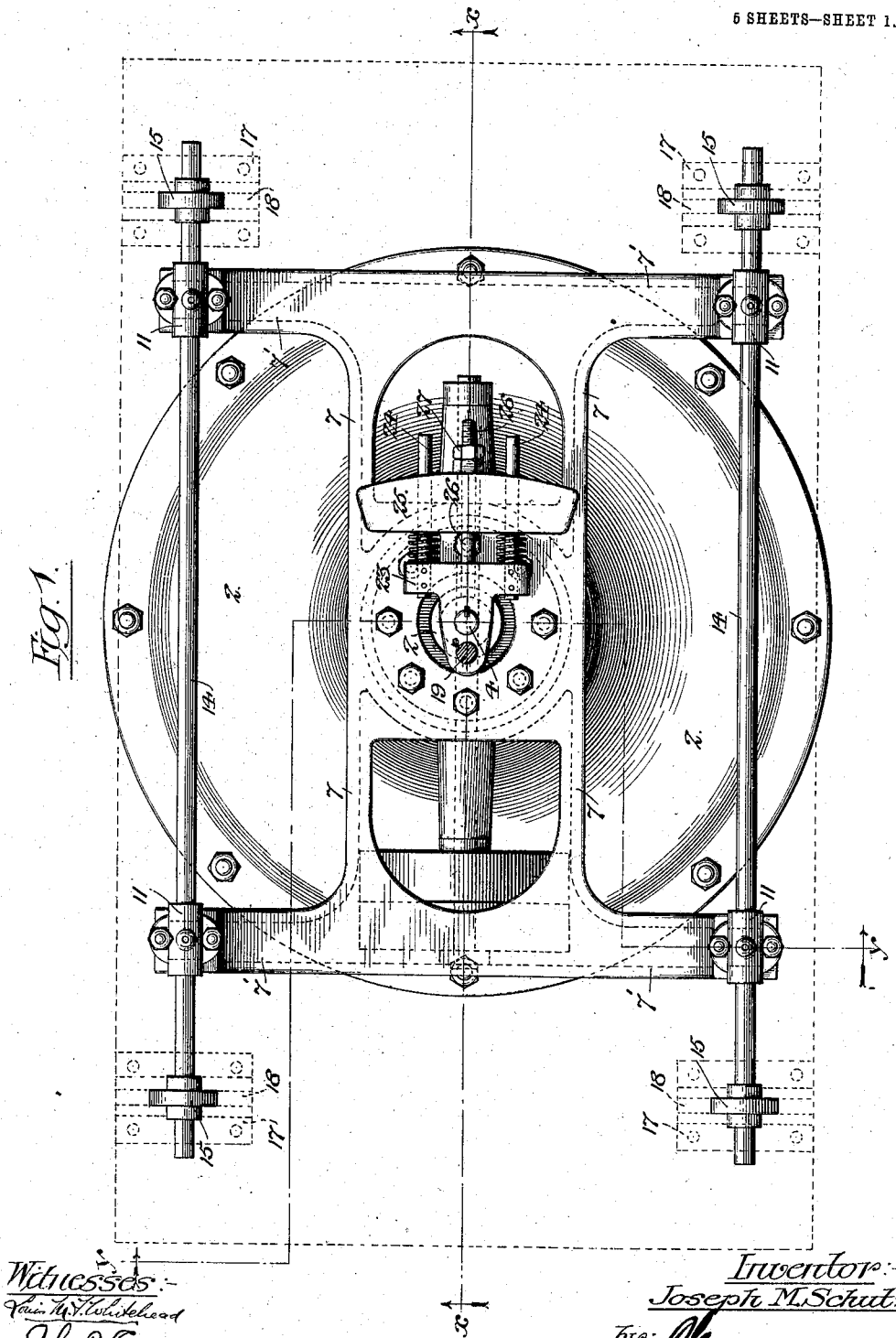
Figure 2:
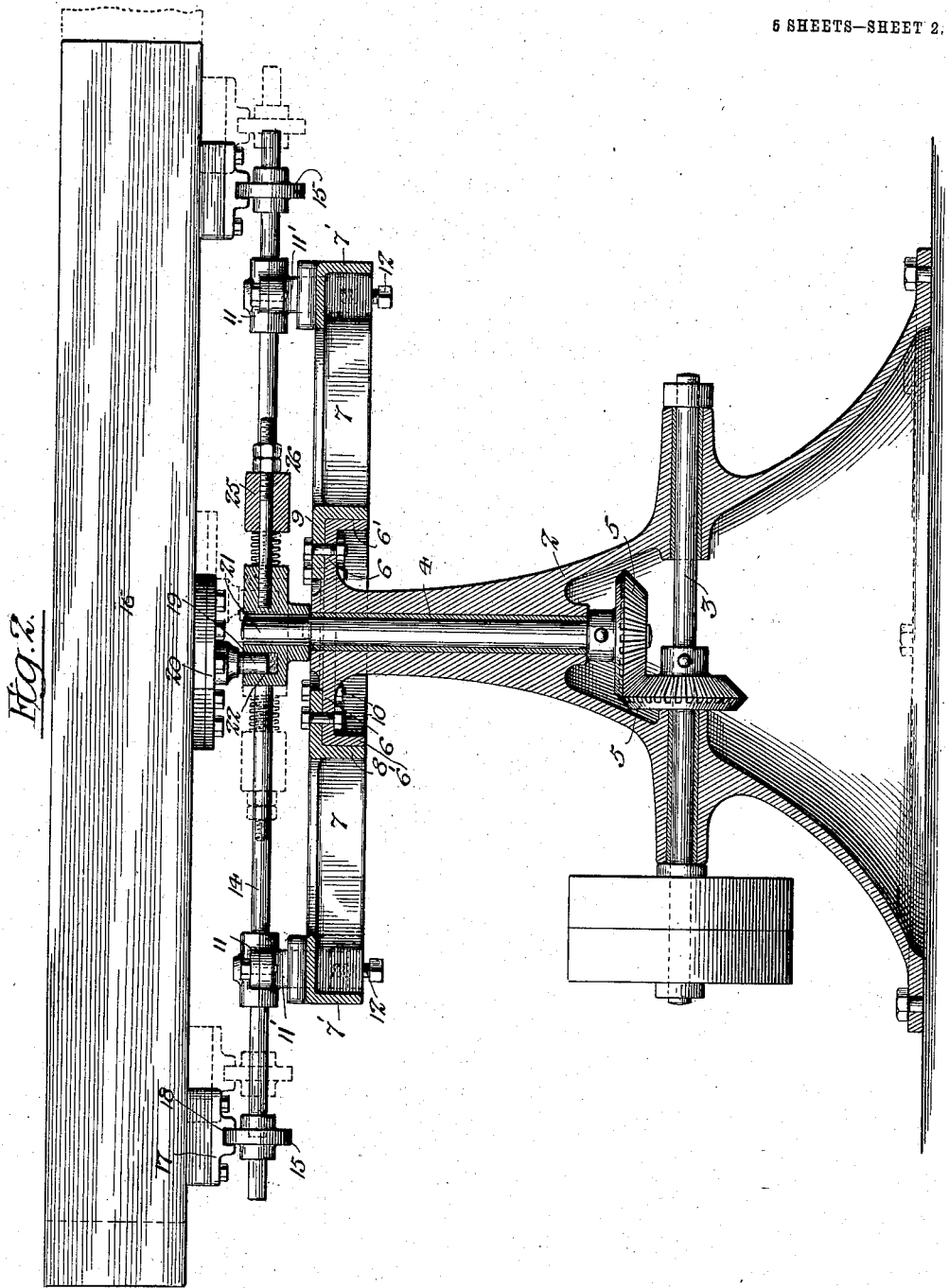
Figure 3:
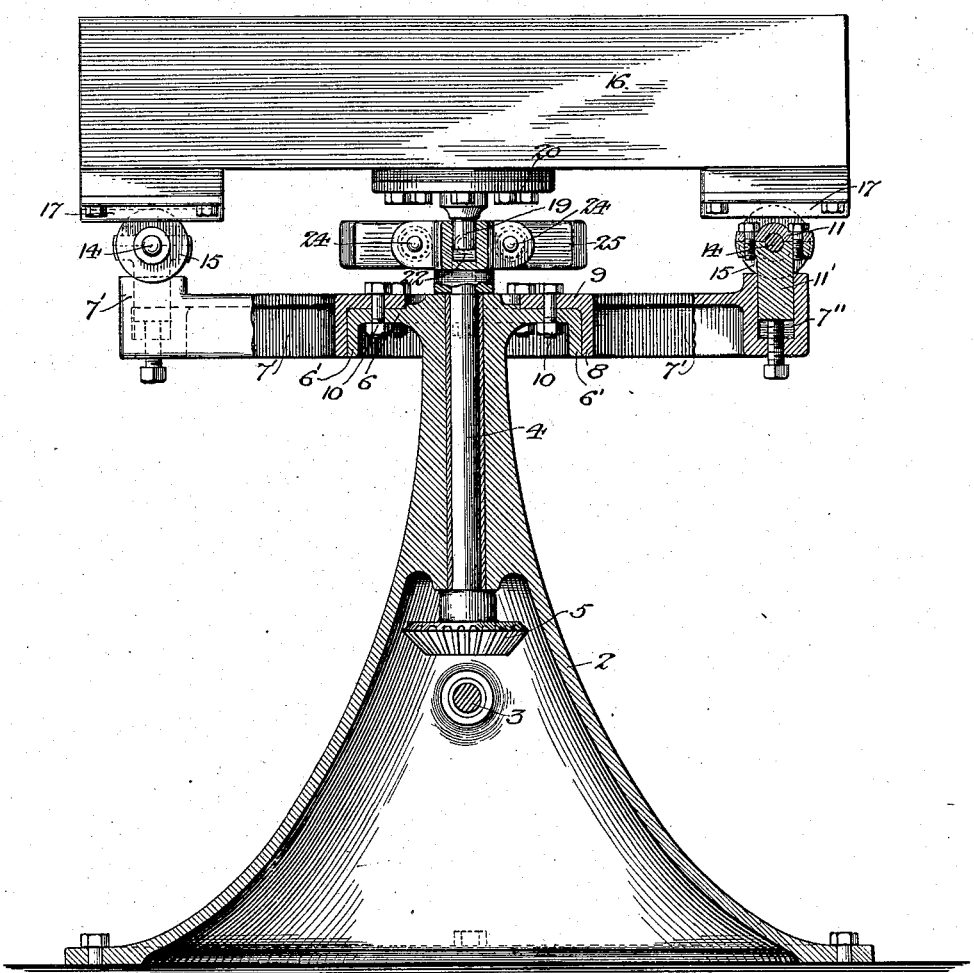

My invention will be more readily understood by reference to the accompanying drawings, forming a part of this specification, and in which Figure 1 is a plan view of a gyrating machine embodying my invention, as the same appears with the gyratory body removed; Fig. 2 is a vertical section of the machine, on the line *x*—*x* of Fig. 1; Fig. 3 is a transverse vertical section, on the irregular line *y*—*y* of Fig. 1. Fig. 4 is a plan view of the adjustable counterbalance, which prevents detrimental and secondary vibration of the body; Fig. 5 is an enlarged vertical section of the crank balancing device. Figs. 6 and 7 are details of the adjustable bearings employed on the base of the machine; Figs. 8 and 9 are side and end views of a plan-sifter embodying my invention, and Figs. 10 and 11 are side and end views of a modification of my invention, wherein the box is operatively suspended within the frame or support of the machine.

As will be clearly understood from the following, the gist of my invention resides in the means employed to prevent the rotation of the working or gyratory member bodily around the working axis of the machine, and which means compel the compound rotary and rectilinear movement that is resolved as gyratory motion. The means which I always employ, comprise one or more parts or members which are axially fixed but which are capable of longitudinal movement with the gyratory body, and with relation to which said gyratory body is transversely movable, there being also suitable means to support said parts or members and to prevent the longitudinal movement of the gyratory body with relation thereto, whereby, when rotary motion in a horizontal plane is imparted to any part in said body, every other part therein is compelled to rotate correspondingly.

My invention is capable of embodiment in many different forms, and I do not intend to confine the same to any specific structure; but nevertheless in carrying out my invention I prefer to interpose one or more horizontal, rotary, reciprocating shafts between the gyratory body and the frame or base belonging thereto. These shafts are arranged to slide or move longitudinally on or in suitable bearings, and the gyratory body rests upon, or is supported in rolling contact with, said shaft or shafts the connection thus afforded permitting the body as a whole to follow the movements of the usual driving crank, though held against bodily rotation about the crank-pin axis. I have herein illustrated my invention only in connection with shifting or screening machines but it is to be undertsood that the invention is not confined to any special application or use, being intended for and capable of adaptation to all kinds of gyratory machinery.

The machine illustrated in Figs. 1, 2 and 3 is a gyrating sifter of the smaller kind, wherein the gyrating body is supported upon a central standard or base as contrasted with the outlying or inclosing frames, typical of larger machines. The central base, 2, may be of any desired form, and contains bearings for a horizontal driving shaft, 3, and a vertical driven shaft, 4. The shafts are joined by beveled gears, 5, within the cavity of the base, and the shaft, 4, extends above the top of the base. This base has a top flange, 6, preferably circular and having a depending flange, 6'.

7 is a frame forming an extension of the top of the base, and provided with a central opening, 8, to fit the flange, 6. It also has a horizontal flange or web, 9, to rest on the base top, to which it is secured by bolts, 10. The frame, 7, preferably has four arms, 7', each carrying a bearing, 11. For purpose of adjustment these bearings are preferably made as shown in Figs. 6 and 7, each having a square shank, 11', fitting a socket, 7'', in the frame, 7, and adjustable by means of a jack or set screw, 12. The bearings may be universally adjustable if need be. Each pair of bearings contains a shaft, 14, adapted to both slide and rotate therein, and alined and adjusted to the same plane by means of the adjustment of said bearings. The ends of the shafts are equipped with transverse enlargements or rollers, 15, which either wholly or partially support the gyratory member or body, 16. Said body, 16, is provided with guide plates 17, having grooves 18, to receive the roller, 15, and which are exactly perpendicular to the shafts, 14. It will be obvious that the body, 16, being thus mounted upon the base, may be moved longitudinally with respect thereto, by reason of the slidable connection afforded by the shafts, 14, and bearings, 11; and further, that the body, guided by the rollers, 15 and the plates, 17, is also free to move transversely with respect to the base, because of the rotary character of said shafts, 14. As here shown, the body, 6, may be depended upon to connect the two shafts, 14, but if desired the two shafts may be independently tied or harnessed for movement together.

While the body is in engagement with the rollers 15, it is incapable of partaking of any position or movement which does not result from the compounding of the longitudinal and transverse motions permitted by the shafts with which it is in rolling contact. The guides 17, and the longitudinal movement of the shaft, 14, are coextensive with the throw of the crank which is used in driving the body. To avoid unnecessary and conflicting strains upon the gyratory body, I prefer to arrange the crank-pin, 19, centrally thereof; and in most cases the throw of the crank-pin is very small as compared with the width and length of the body. The crank-pin, 19, is attached to or is a part of the body-plate, 20, and 21 represents the crank keyed to the upper end of shaft, 4. The pin, 19, may be in the crank, but I prefer the construction herein shown as the same provides an oil-well or crank-pin socket, 22, in the crank, which well may be filled with oil to lubricate the pin, 19. Oil may be fed into the well through the pin, 19, if desired. The crank length determines or fixes the extent of the movement of the body, 16; while the shafts, 14, determine the effect and kind of movement imparted to said body. The body being restrained by the shafts, rollers and guides has no peripheral rotation about either the shaft, 4, or the crank-pin. Certain points, however, rotate therein with respect to the shaft, 4, and the center of gravity of the gyratory body is eccentric to said shaft 4. This being the case, the rapid rotation of the crank tends to produce a violent secondary vibration in the body and a reflex vibration in the base. The ultimate and objectionable vibration is in the base, and unless minimized or prevented, would to an annoying or dangerous extent be communicated to the building containing the machine. To overcome and prevent such secondary vibration I employ a counterbalance on the shaft, 4. The crank-piece, 21, is given the form shown in Figs. 1 and 4 to provide a wide extension, 23 on the opposite side of the shaft, 4. In the ends of this extension I arrange the studs, 24, to serve as guides for the movable counterbalance weight, 25. A middle stud, 26, extends from the part 23, through the middle of the counterbalance weight, 25. The outer end of this stud is threaded and provided with lock-nuts, 27. The weight, 25, is slidable on the studs, 24, and it is obvious that the same will be held outward against the lock-nuts, 27, by centrifugal force when the shaft, 4, is rotated. For security and to facilitate the adjustment of the weight, 25, by means of the nuts, 27, I use one or more springs, 28, between the parts 23 and 25, preferably upon the studs, 24, as shown. In its inner position, the weight, 25, balances the body, 16, and when moved or adjusted outwardly will operate to perfectly balance said body, plus the effective load of material in or upon the same. This delicately adjusted counterbalance relieves the shaft, 14, and rollers, 15, and bearings, 17, from all strains, except those incident to their restraint of the body 16, which is very slight.

In Figs. 8 and 9, I have illustrated my invention as applied to a large plan-sifter of the kind used in flour mills. The construction is operatively identical with that of the machine above described, the base only taking a different form; 2, being said base, 11 the bearings, 14 the reciprocatory rotary shafts, 15 the rollers, and 17 the guide plates on the bottom of the body, 16, as in the other figures of the drawings, though of different dimensions. The driving crank and counterbalance members here shown, are those which are typical of well-known machines, and do not require special description. Figs. 10 and 11 illustrate a sifting machine wherein the body, 16, is arranged within an inclosing frame, A, which is equipped with bracket-like bearings, 11$^A$, for the shafts, 14. Said shafts, the rollers, 15, and the guides, 17, remain as in the other figures of the drawing save that cross strips B are provided on the bottom of the sifter-box, 16, to receive the guide plates 17.

As modifications of my invention will readily suggest themselves to one skilled in the art, I do not confine my invention to the specific constructions herein shown and described.

Having thus described my invention, I claim as new, and desire to secure by Letters Patent:—

1. In a gyrator, a member to be gyrated, in combination with a support or frame, a mechanism for rotatively driving said member, and a movement resolving mechanism interposed between said member and said frame, and comprising rotary reciprocatory shafts equipped with rollers, and guides for said rollers, said shafts and guides being arranged at right angles upon said frame and said member, substantially as and for the purpose specified.

2. In a gyrator, a member to be gyrated, its frame and driving mechanism, in combination with guides attached to said members and in a horizontal plane, shafts having both rotary and reciprocatory movements, bearings on said frame for said shafts and at right angles to said guides, and rollers on said shafts engaged with said guides; substantially as described.

3. In a gyrator, a member to be gyrated, its frame and driving mechanism, in combination with parallel guides upon said member, rotary-reciprocating shafts, occupying a plane parallel to said guides, but at right angles to the latter, bearings upon said frame for said shafts, and rollers upon said shafts, fixed with relation to one another and engaged with said guides, substantially as described.

4. In a gyrator, a member to be gyrated, its frame and driving mechanism, in combination with guides upon said member, shaft bearings upon said frame, at right angles to the guides upon said member and in a plane parallel to the plane of said guides, and shafts adapted to reciprocate and rotate in said bearings and engaged with and supporting said guides and said member, substantially as described.

5. In a gyrator, a member to be gyrated, its frame and rotary driving mechanism, in combination with a plurality of bearings, arranged upon said frame and occupying a horizontal plane, parallel shafts slidably and rotatively mounted in said bearings, rollers upon said shafts, and horizontal guides upon said member, at right angles to said shafts and engaged with said rollers, substantially as described.

6. In a gyrator, a base or frame, in combination with pairs of parallel bearings, upon said frame, and in substantially the same horizontal plane, shafts mounted in said bearings, rollers on said shafts, transversely movable guides resting on said rollers, a body supported by said guides, and a rotary driving mechanism for said body, substantially as described.

7. In a gyrator, a base, in combination with a plurality of arms thereon, horizontal bearings on said arms, shafts to rotate and slide in said bearings, transverse guides occupying the same plane, resting upon said shafts, a body attached to said guides, means preventing relative longitudinal movement of said body and shafts, a crank mounted upon said base for driving said body, and a suitable counterbalance for said body, substantially as described.

8. In a gyrator, a base or standard, a top plate fitted thereon, and provided with horizontal bearings, shafts mounted in said bearings, said shafts being parallel and occupying the same plane, rollers on said shafts, a body having guides to engage said rollers at right angles to said shafts, a crank shaft mounted in said base, and a crank thereon engaged with said body, substantially as described.

9. In a gyrator, a base or standard, a top plate fitted thereon, and provided with horizontal bearings, shafts mounted in said bearings, said shafts being parallel and occupying the same plane, rollers on said shafts, a body having guides to engage said rollers at right angles to said shafts, a crank shaft mounted in said base, a crank thereon engaged with said body and a laterally adjustable counterweight upon said crank, substantially as described.

10. In a gyrator, a base and a member to be gyrated, in combination with a pair of parallel shafts, slidably and rotatably mounted in bearings on said base, parallel guides upon said member at right angles to said shafts and co-acting therewith, means preventing longitudinal movement of the shafts in relation to said guides and means for driving said member, substantially as described.

11. In a gyrator a base or frame, in combination with a member to be gyrated, a driving crank therefor, parallel guides on said member, parallel shafts slidably and rotatably mounted on said base at right angles to said guides and forming longitudinally movable roller supports for said guides, substantially as described.

In testimony whereof, I have hereunto set my hand this 15 of March, A. D. 1904, in the presence of two witnesses.

JOSEPH M. SCHUTZ.

Witnesses:
W. H. EUSTIS,
B. A. O'NEILL.